United States Patent [19]

Mor

[11] Patent Number: 5,143,101
[45] Date of Patent: Sep. 1, 1992

[54] APPARATUS FOR WASHING LENSES

[76] Inventor: Avi Mor, 18 Nahal Kane Street, Kfar Sava, Israel

[21] Appl. No.: 643,917

[22] Filed: Jan. 18, 1991

[30] Foreign Application Priority Data

Jan. 25, 1990 [IL]  Israel ..................................... 093174

[51] Int. Cl.⁵ .............................................. B08B 3/02
[52] U.S. Cl. .................................. 134/58 R; 134/95.2;
134/108; 134/111; 134/199; 134/95.3
[58] Field of Search ............... 134/901, 58 R, 95, 105,
134/107, 108, 110, 111, 199, 200; 206/5, 5.1;
15/214, 215, 216, 217, 244.1, 244.3

[56] References Cited

U.S. PATENT DOCUMENTS

| | | | |
|---|---|---|---|
| 2,127,778 | 8/1938 | Lewis | 134/200 X |
| 2,148,009 | 2/1939 | Bing | 15/244.1 X |
| 2,390,757 | 12/1945 | Voris | 134/105 X |
| 2,908,923 | 10/1959 | Schlechter | 15/244.1 X |
| 3,049,133 | 8/1962 | Jacobs | 134/108 X |
| 3,063,083 | 11/1962 | Obitts | 15/214 X |
| 4,546,517 | 10/1985 | Caniglia | 15/214 |
| 4,784,167 | 11/1988 | Thomas et al. | 134/901 X |
| 4,960,142 | 10/1990 | Robb et al. | 134/200 X |

Primary Examiner—Philip R. Coe
Attorney, Agent, or Firm—Charles E. Baxley

[57] ABSTRACT

A lens washing apparatus includes a wash chamber, a reservoir for holding wash fluid, a pair of spaced nozzles facing each other, a lens support for holding a lens between the nozzles, a pump for squirting wash fluid through the nozzles onto the lens, a heater for heating the wash fluid, mechanism for maintaining a wash fluid vapor atmosphere in the wash chamber after the pump shuts off, and electronic elements for controlling the operation of the apparatus. A method for washing a lens includes the steps of impinging the lens surfaces with an organic volatile wash fluid during a wash cycle, shutting off the flow of wash fluid, allowing residual wash fluid to be drawn off the lens edge by fibers or filaments, and drying the lens in the presence of a wash fluid vapor atmosphere.

3 Claims, 4 Drawing Sheets

APPARATUS FOR WASHING LENSES

BACKGROUND OF THE INVENTION

The present invention relates to an apparatus for washing lenses, specifically eyeglasses lenses.

It is well-known that in the course of a day eyeglasses tend to accumulate dirt or grease on the lenses which interfere to a greater or lesser extent with the vision of the wearer of these eyeglasses. What people do today when they feel that their lenses are soiled is to use any handy wiping material, such as handkerchiefs or tissues, to wipe the lenses. Special impregnated tissues and cloths have been developed for this purpose. However, this manual effort at cleaning glasses is rarely totally effective, since one invariably tends to overlook certain areas of the lens or sometimes even smudge clean sections of the lens by transferring some of the dirt from other parts of the lens. It would be extremely valuable to have an automatic inexpensive eyeglass-washing apparatus that would fully clean the lenses in a very short time. Such an apparatus could be installed at home and in the workplace for convenient use almost at any time.

SUMMARY OF THE INVENTION

A main object of the invention is to provide an apparatus for washing lenses, specifically eyeglasses lenses automatically, efficiently and inexpensively.

There is provided in accordance with this invention a compact portable lens washing apparatus comprising:

a box-like housing having disposed therein a wash chamber, a reservoir for holding wash fluid, a pair of nozzles oppositely disposed in the wash chamber and spaced apart to face one another, a lens support adapted to hold a lens so that each lens surface faces a nozzle, a pump and suitable pipeline adapted to transport wash fluid from the reservoir and eject same from the nozzles onto the lens, heating means disposed in line between the reservoir and the nozzles for heating the wash fluid, means for maintaining an atmosphere of wash fluid vapors in the wash chamber after the pump has ceased transporting wash fluid, a power source to operate the pump and the heating means, a switch for activating the apparatus, and electronic means, including wash cycle timer and drying cycle timer which are activated when the switch is turned on, whereby when the switch is turned on, wash fluid is ejected from the nozzles onto the lens in the wash chamber for a predetermined amount of time, at the end of which time the lens is dried in a vapor atmosphere of the wash fluid.

BRIEF DESCRIPTION OF THE DRAWING

For a better understanding of the invention, reference is made to the accompanying drawings, in which.

DETAILED DESCRIPTION OF A PREFERRED EMBODIMENT

Figure 1:
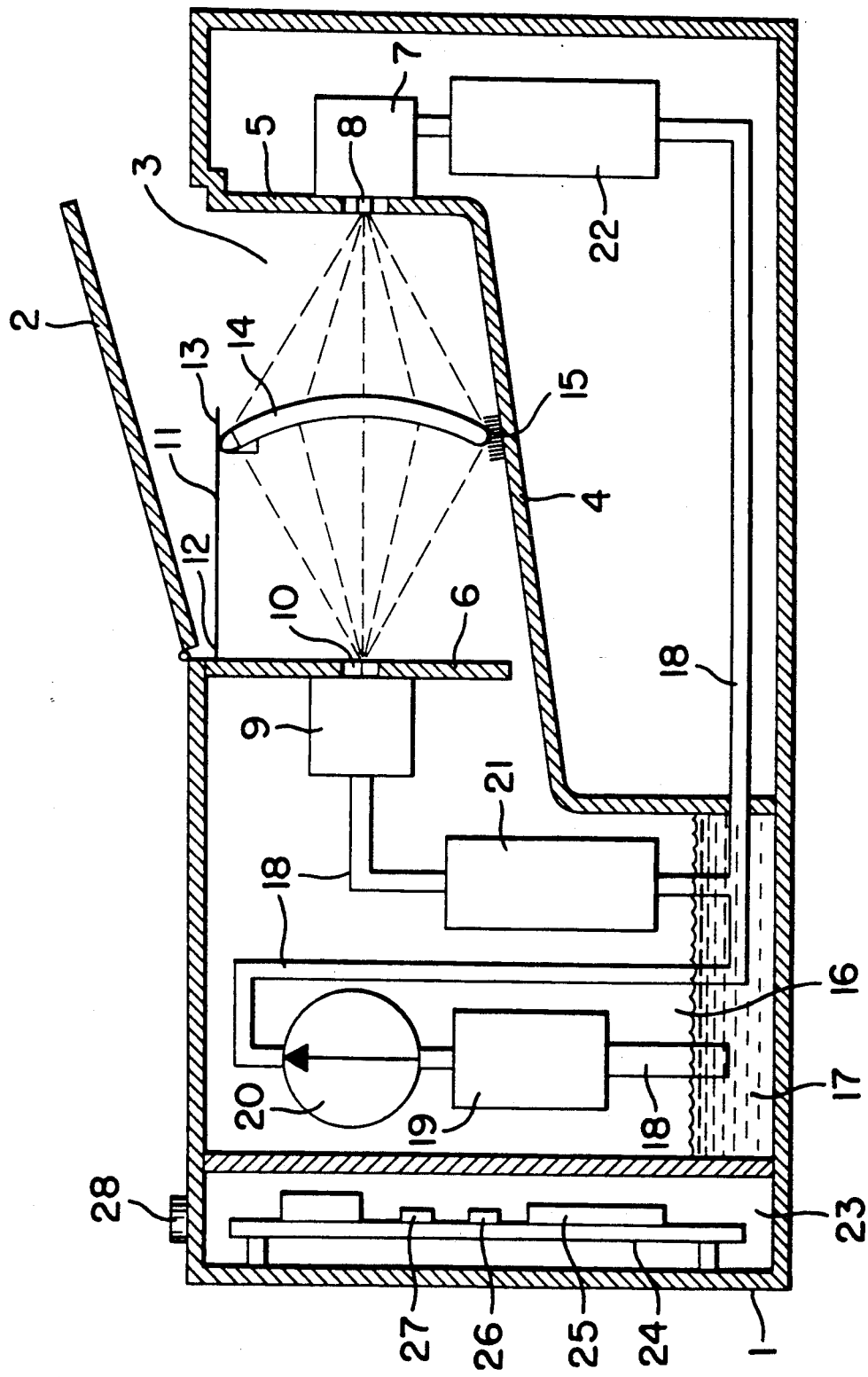
FIG. 1 is a schematic cross-sectional side view of an apparatus for washing lenses constructed and operative in accordance with an embodiment of the invention.

Referring now to FIG. 1, there is shown a box-like housing 1 with hinged cover 2. Underneath the cover there is a wash chamber 3 with an inclined floor 4 and forward and rear partitions 5 and 6, respectively. A nozzle 7 is mounted in the forward partition 5 with its orifice 8 facing the wash chamber 3. Similarly, a nozzle 9 is mounted on the rear partition 6 having an orifice 10 facing the wash chamber 3. A lens holder 11, which can be a metal spring, is fastened at one end 12 to partition 6 with the other end 13 exerting pressure on a lens 14 inserted in wash chamber 3 in an upstanding position. The lens 14 is supported on a fibrous non-absorbing mat 15, such as one made of Velcro (TM), whose function will be detailed further on. The housing I further comprises a reservoir 16 for holding wash fluid 17. A pipeline 18 leading from the wash fluid 17 to the nozzles 7 and 9 has coupled to it in line a filter 19, a pump 20 and heaters 21 and 22. Within housing 1 there is also disposed a separate compartment 23 containing the electronics on a circuit board 24 as well as a power unit 25, including a washing control timer 26 and dry cycle control timer 27. An on-off switch 28 turns the apparatus on, while the electronics turn the apparatus off upon completion of the complete wash-dry cycle.

Figure 2:
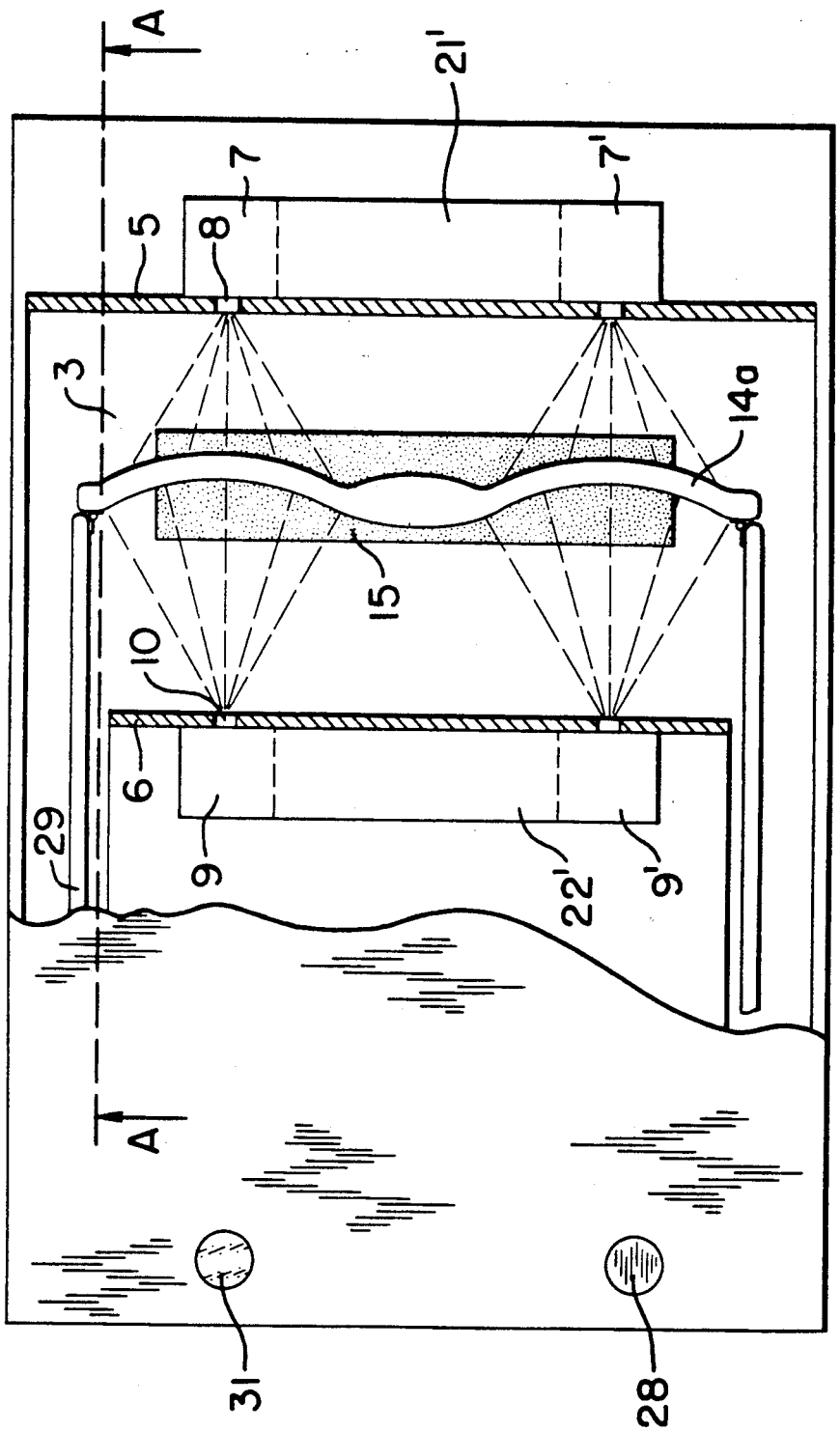
FIG. 2 is a cut away, partial schematic top view of an apparatus according to this invention for washing eyeglasses.
Figure 3:
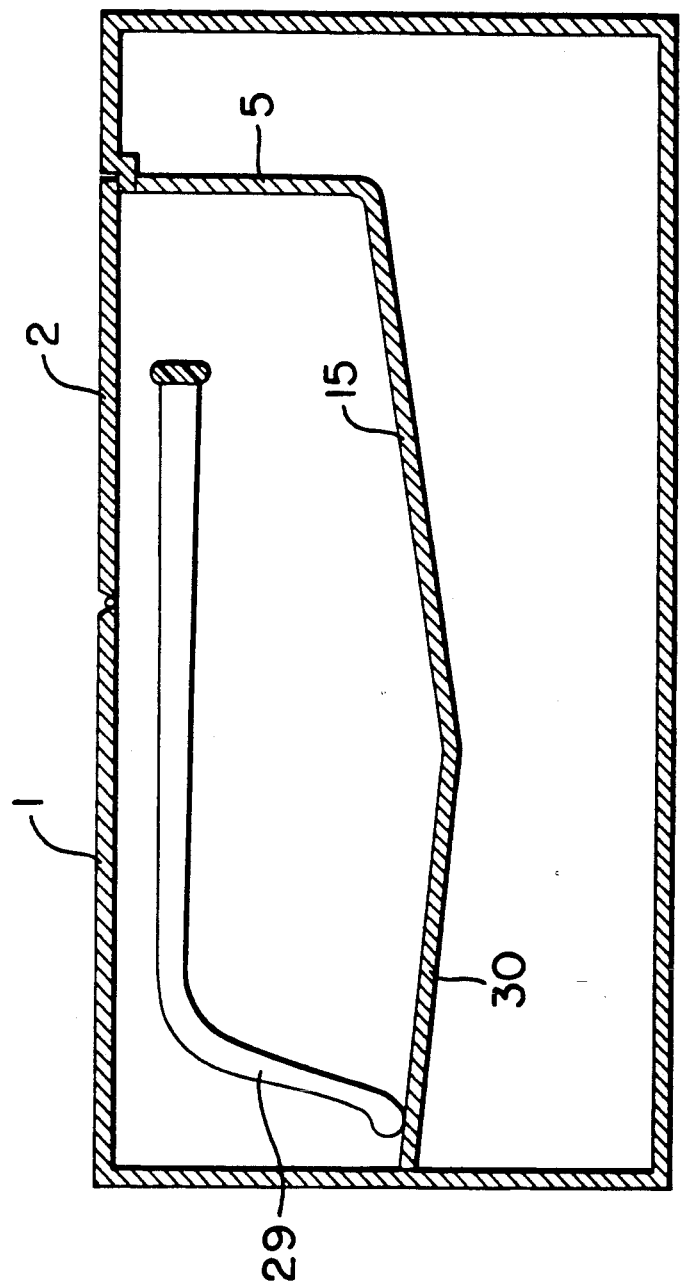
FIG. 3 is a cross-sectional view of the apparatus of FIG. 2 taken along line A—A of FIG. 2.

Referring now to FIGS. 2 and 3, these show top and cross-sectional views of an apparatus adapted for washing eyeglasses, i.e. two lenses at the same time. In this instance the eyeglasses 14a are placed with lower rims or lenses on the fibrous mat 15 and are kept upright by placing their bows 29 on a support 30 (FIG. 3) provided in the housing. Four nozzles 7, 7', 9 and 9' are arranged in the forward and rear partitions 5 and 6 respectively, and centered with respect to the lenses in eyeglasses 14a. Heating elements 21' and 22' are arranged adjacent to the nozzles 7, 7', 9 and 9'. The apparatus may also contain, in addition to switch 28, an indicator light 31 showing when the apparatus is in operation.

Figure 4:
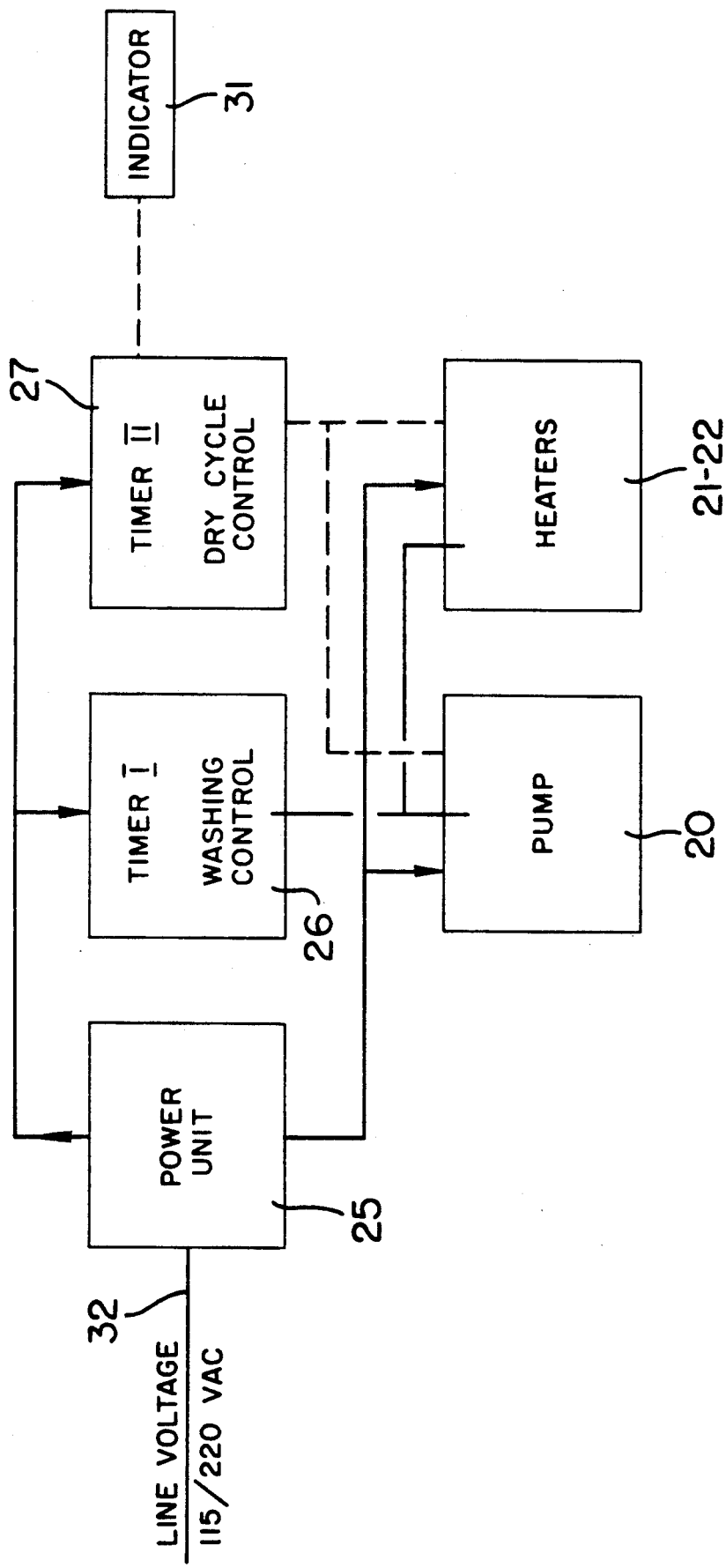
FIG. 4 is a block diagram of the electronic circuit for automatic actuation of the device.

FIG. 4 is a block diagram of the electronics on the circuit board 24 in compartment 23 of housing 1, which includes a power source 32, which may be a battery, and a power unit 25. When the apparatus is switched on, the washing control timer 26 determines the length of wash cycle including the pumping and heating time of the wash fluid. The dry cycle control timer 27 sets the time for allowing the evaporation of wash fluid before the apparatus is shut off, as shown by indicator light 31.

The lens washing apparatus works as follows, with reference to FIG. 1. Cover 2 is lifted and the lens 14 is inserted in the wash chamber 3 and placed on mat 15 in an upright position and held there by spring holder 11, whose end 13 presses on upper edge of lens 14. The cover 2 is closed and switch 28 is then activated to start the wash cycle. Wash fluid 17 is pumped by pump 20 from reservoir 16 through filter 19 via pipeline 18, which removes any solid impurities. The fluid 17 flows to the heaters 21, 22 where it is heated to the desired temperature, The heated wash fluid continues to the nozzles 7 and 9, respectively and is ejected under pressure from orifices 8 and 10 to impinge on front and back surfaces of lens 14, respectively, spreading out over the entire lens, cleaning it on both surfaces. The type of nozzles used to eject the wash fluid may be spray nozzles or sprinkler nozzles among others. What is important is that the wash fluid impinge on the lens with some force and not merely wet it. The bulk of the wash fluid runs down from the lens surfaces onto the inclined floor 4 and returns to the reservoir 16. The residual fluid which trickles down the lens is decanted by the fibers of mat 15 and is led to wash chamber floor 4 for returning to reservoir 16. Wash control timer 26 determines the length of time for pump 20 to cycle the wash fluid and for heaters 21 to heat the fluid before shutting down. Once this wash cycle is concluded, the dry cycle control timer 27 determines the duration of the drying cycle before the entire apparatus is shut off automatically and indicator light 31 is extinguished. The drying cycle begins with the cessation of wash fluid impinging onto the lens 14. The residual liquid wash fluid which trickles down the lens is completely drawn off therefrom by the filaments of mat 15. The residual heat in the system is sufficient to evaporate the remaining wash fluid within the nozzles 7 and 9 and heaters 21 and 22 to provide a vapor atmosphere in the wash chamber, while the lenses are drying, thereby assuring uniform and clear evaporation of the wash fluid from the lens surfaces. This feature is important since drying in the absence of vapor atmosphere often results in imperfect cleansing. Alternate methods for providing fluid vapors during drying are possible, such as for example providing a trough in the wash chamber to prevent some of the fluid from the wash cycle returning to the reservoir. This fluid would then evaporate during the drying cycle. This evaporation could be enhanced by heating the fluid.

The preferred wash fluids are non-aqueous solvents, preferably mixtures of alcohol with volatile fluorocarbons or chlorofluorocarbons. For example a most preferred wash solvent comprises a mixture of about 20–30% ethyl alcohol and 70–80% Freon 113 (trifluorotrichloroethane). Other low volatile solvents or solvent mixtures may also be used. These wash fluids though are preferably heated to make them more volatile and therefore evaporate more readily from the lens surface. Non-aqueous wash fluids in general for cleaning or washing lenses are known in the art. However, the specific combination of the above solvents in the proper proportions is particularly suitable for use in the automatic washing apparatus of the present invention.

It will be appreciated by those skilled in the art that the invention is not limited to what has been shown and described hereinabove by way of example only.

What is claimed is:

1. A compact portable lens washing apparatus comprising:
   a box-like housing having provided therein a wash chamber,
   the housing further provided with a reservoir situated lower than the wash chamber for holding wash fluid and in flow communication with the wash chamber for receiving wash fluid back therefrom, a pair of nozzles oppositely disposed in said wash chamber and spaced apart to face one another,
   a lens support floor inclined downwardly toward and in open communication with said reservoir and adapted to hold a lens between said nozzles so that each lens surface faces a different one of said nozzles,
   a filter and a pump and a pipeline all adapted operatively in flow series to transport wash fluid from the reservoir and eject same from said nozzles onto said lens,
   heating means adjacent to said nozzles and disposed in line between said reservoir and said nozzles for heating said wash fluid during a wash cycle and adapted for providing sufficient residual heat when turned off to vaporize residual wash fluid into the wash chamber during a drying cycle,
   vapor maintaining means operatively associated with the heating means for maintaining an atmosphere of wash fluid vapors in said wash chamber after said pump has ceased transporting wash fluid,
   a power source to operate said pump and said heating means and said vapor maintaining means,
   a switch for activating said apparatus,
   a blow dryer operatively associated with said wash chamber, and
   electronic means including a wash cycle timer and a drying cycle timer which are activated when the switch is turned on, whereby when the switch is turned on wash fluid is ejected from the nozzles onto said lens in the wash chamber for a predetermined time, at the end of which time the lens is dried by the blow dryer in a vapor atmosphere of the wash fluid.

2. The apparatus set forth in claim 1, further comprising a second pair of nozzles facing each other, whereby the apparatus is adapted to wash simultaneously two lenses such as in a pair of eyeglasses.

3. The apparatus set forth in claim 1, further comprising a lens support mat on said lens support floor adapted to draw off wash fluid from the lower edge of a lens being washed.

* * * * *